United States Patent [19]

Fabian

[11] 4,262,699
[45] Apr. 21, 1981

[54] SANITARY FITTING

[75] Inventor: Wolfgang Fabian, Mannheim, Fed. Rep. of Germany

[73] Assignee: American Standard Inc., New York, N.Y.

[21] Appl. No.: 50,937

[22] Filed: Jun. 21, 1979

[30] Foreign Application Priority Data

Jun. 28, 1978 [DE] Fed. Rep. of Germany ....... 2829081

[51] Int. Cl.³ .............................................. E03C 1/04
[52] U.S. Cl. ........................................ 137/801; 4/192;
137/615; 137/625.41; 137/799
[58] Field of Search ............... 4/192; 137/615, 625.17, 137/625.4, 799, 801, 625.41

[56] References Cited

U.S. PATENT DOCUMENTS

| 2,535,580 | 12/1950 | Kersten | 137/625.41 |
| 2,910,090 | 10/1959 | Weir | 137/615 X |
| 3,156,260 | 11/1964 | Harvey et al. | 137/625.41 |
| 3,373,770 | 3/1968 | Ward et al. | 137/615 |
| 3,653,407 | 4/1972 | Katva | 137/615 |

Primary Examiner—Gerald A. Michalsky
Attorney, Agent, or Firm—James J. Salerno, Jr.; Robert G. Crooks; John P. Sinnott

[57] ABSTRACT

A sanitary fitting adapted to be rotatably mounted to a sanitary fixture is disclosed. The sanitary fitting includes a valve body and spout assembly and may be of unitary design. The valve body and spout assembly is rotatably mounted on a tubular manifold which is rigidly mounted to the sanitary fixture. Flexible hose means is coupled between a supply source and the valve body. Special seal means, such as O-rings, lubricants or the like, is not required since the flexible hose means is coupled to the valve body whereby water does not contact the rotatable connection.

4 Claims, 3 Drawing Figures

SANITARY FITTING

BACKGROUND OF THE INVENTION

In the manufacture of sanitary fittings, it has been the practice to design a valve for a kitchen or lavatory fixture so that the spout swivels or rotates about the valve body. One disadvantage encountered by such a design is that the water carrying part, that is the spout, is rotated about the valve body and requires a water tight seal. This is generally accomplished by use of O-rings, lubricants, etc.; however, they are subject to wear or the lubricant is lost through the joint connection. In designs of this type the spout is generally difficult to rotate about the valve body because it must be constructed with close tolerances to prevent leaking.

SUMMARY OF THE INVENTION

It is an object of the present invention to provide a sanitary fitting in which the spout does not rotate about the valve body.

It is another object of the invention to provide a sanitary fitting in which the spout and valve body are of unitary design and which is rotatably mounted on a tubular manifold.

Another object of the invention is to provide flexible hose means which is coupled between the valve body and the water supply so that when the unitary spout and valve body member is rotated, the flexible hose means is also rotated.

It is a further object of the invention to provide a rotatably mounted sanitary fitting which is leak-proof, does not require O-rings or lubricants to provide a water tight seal, is economical to manufacture and which utilizes flexible hose means to supply water to the valve body.

The invention generally contemplates providing a sanitary fitting adapted to be mounted on a sanitary fixture, such as a kitchen sink, lavatory or the like. The sanitary fitting comprises a tubular manifold which is adapted to be threadedly mounted to the sanitary fixture. A valve body and spout assembly is rotatably mounted on the manifold with flexible hose means coupled between the valve body at one end, and to the water supply at its other end so that when the sanitary fitting rotates, the flexible hose means also rotates.

IN THE DRAWINGS

By way of example, a sanitary fitting embodying the present invention is illustrated in the accompanying drawings wherein:

FIG. 1 is a front elevation, partly in section of a sanitary fitting embodying the present invention;

FIG. 2 is a sectional view along the lines A—B of FIG. 1; and

FIG. 3 is a view similar to FIG. 1 which illustrates the rotation of the flexible hose means and the valve body about 90°.

BRIEF DESCRIPTION OF THE DRAWINGS

The above objects and other objects of the invention will become more readily apparent from the following description of the preferred embodiment illustrated in the drawings.

Figure 1:
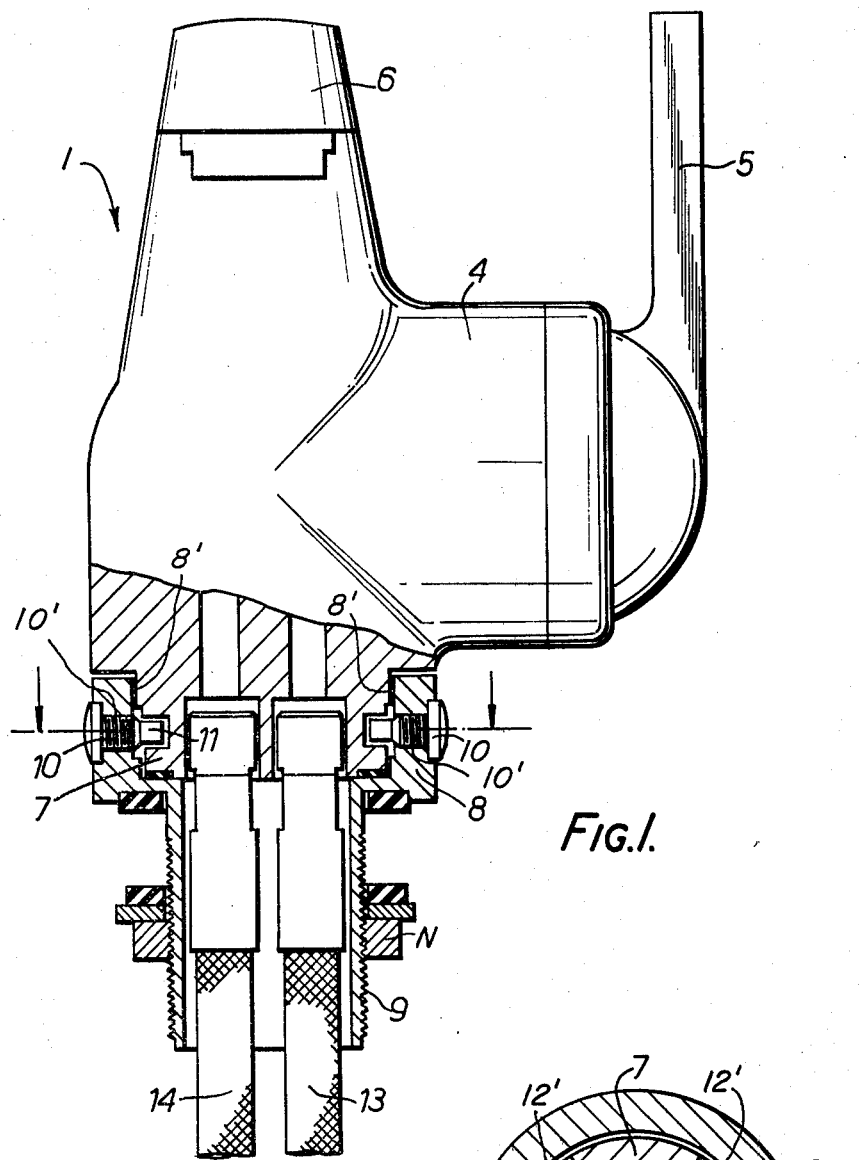
Referring to FIG. 1, there is illustrated a sanitary fitting 1 which includes a valve body 4 and spout assembly 6. As illustrated, the valve body and spout is of unitary design, although other means of fabrication may be utilized, for example the spout may be threadedly coupled to the valve body. A valve mechanism, not shown, is operably mounted in the valve body 4 and is manipulated by handle 5 between its on and off positions. The lower end or base of body 4 is rotatably mounted on a tubular manifold 8 by means of a base or pivot-like trunion 7. The tubular manifold is formed with a recess to provide an upstanding shoulder or housing 8' and a horizontal rim to provide a horizontal surface for base 7 to mate therewith to provide a joint for rotating valve 4 with respect to manifold 8. The pivot-like trunion 7 is provided with diametrically formed horizontal slots 12 which are parallel to base 7 of the valve body 4 and is best illustrated in FIGS. 1 and 2. Diametrically opposed threaded openings 10' are formed in the upstanding wall 8' of tubular manifold 8 to mount screws 10 therein. Screws 10 are formed with a non-threaded end 11 of reduced diameter which nests in slots 12. Each end of slots 12 form stop means which engage end 11 of screw 10 to prevent valve body 4 from rotating beyond 90°. Screws 10 provide adjustable tension means to maintain a determined force for sliding frictional engagement between the complementary surfaces of base 7 and manifold 8 forming the rotatable joint of sanitary fitting 1. This is accomplished by applying screw tension against the trunion-like bearing 7 of valve body 4. In this connection, it will be observed from FIG. 1 that the rotatable joint is not a water tight joint and does not require seal means since the water supply connection is mounted directly to valve body 4 and no water passes through or around the rotatable joint.
Figure 2:
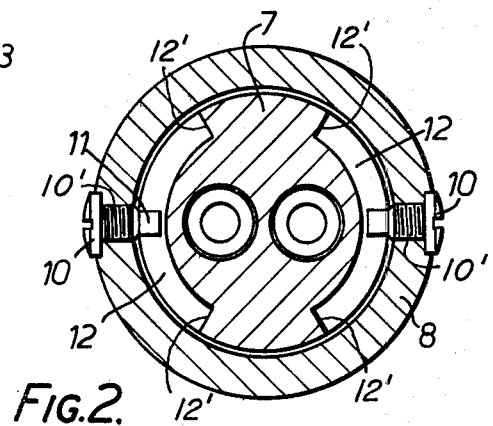
Figure 3:
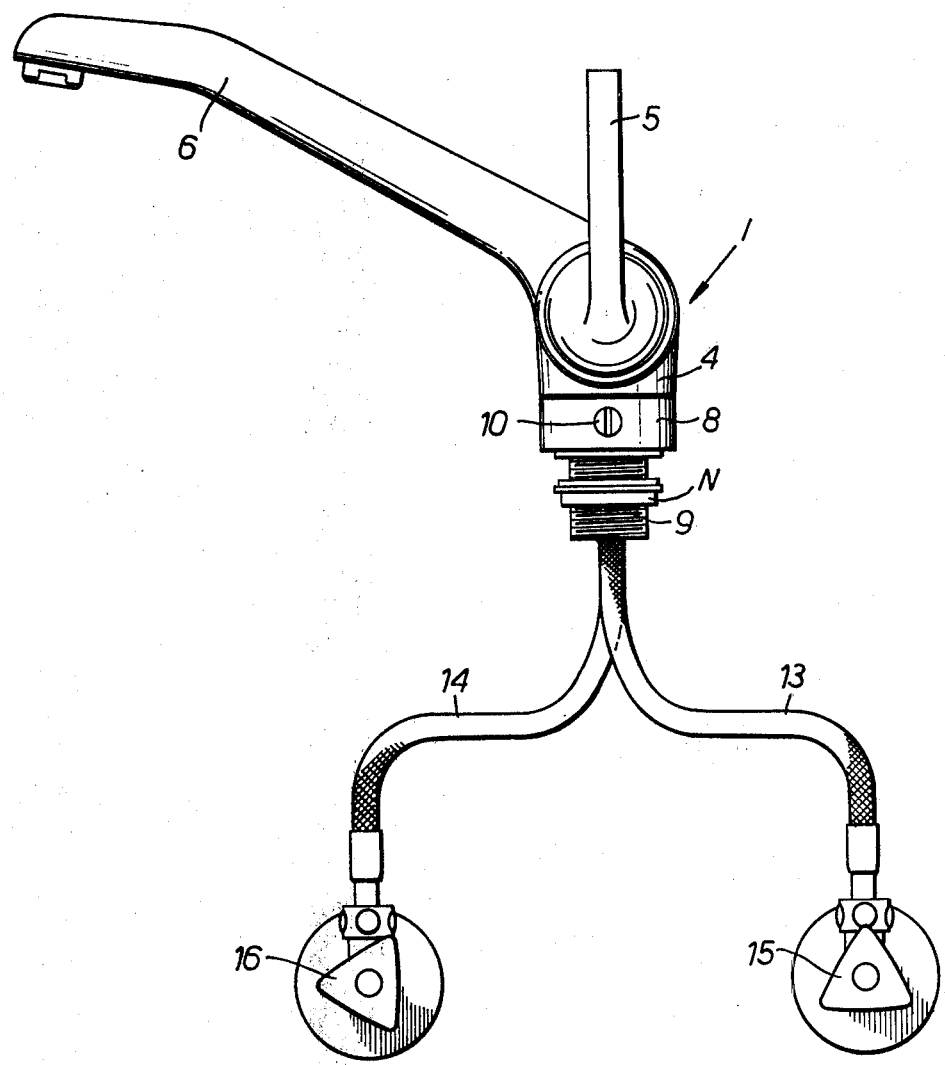

Flexible hose means is shown in FIG. 3 wherein cold and hot water flexible hoses 13 and 14 are coupled to cold and hot water valves 15 and 16, respectively, at one end as by a threaded coupling or the like. The other ends of cold and hot water flexible hoses 13 and 14 are housed within tubular manifold 8 and are rigidly connected to the hot and cold water inlet openings of valve body 4. Suitable coupling means such as threaded hot and cold water inlet openings formed in the base of the valve body 4 receive the threaded ends of flexible tubes 13 and 14 in water tight connection as illustrated in FIG. 1.

As described hereinabove, rotatable valve body 4 is mounted in sliding frictional engagement under predetermined tension with manifold 8 by adjusting the screw tension against the pivot-like trunion 7 or valve body 4. This will prevent unitary valve body and spout from being rotated or swivelled accidentally when handle 5 is operated between its open and closed positions. By adjusting the proper screw tension against pivot-like trunion 7 unintentional rotation of the unitary valve body and spout is avoided. Also by the present design, the rotatable joint or coupling is not subjected to water pressure so that there is not possibility of a water leak through the joint and no special water tight seal means is required. Valve body 4 is coupled to flexible hoses 13 and 14 in water tight engagement so that as the valve body rotates, the flexible hoses also rotate.

These and other objects of the invention have been accomplished by the present design for a rotatable sanitary fitting or valve as described herein. The fitting is of a simple design and can be readily installed on standard sanitary fixtures by inserting manifold 8 through an opening in the fixture and is mounted in position by threaded engagement by nut N. Choice of materials for making valve assemblies such as metal or plastic or valve assemblies having metal and plastic components can be utilized without departing from the spirit and scope of the present invention.

What is claimed is:

1. A sanitary fitting adapted to be mounted on a sanitary fixture such as a kitchen sink or a lavatory, said fitting comprising:
   a tubular manifold removably mounted to said fixture in fixed position;
   a valve body having a base including water inlet openings to connect said sanitary fitting to a source of water;
   a spout integrally formed with said valve body;
   said base of said valve body and said manifold being in sliding frictional engagement and forming a rotatable joint;
   coupling and tensioning means removable mounting said valve body and spout to said manifold; and
   flexible hose means adapted to be coupled between said water supply means at one end and to said water inlet openings of said valve body at the other end so that when said valve body and spout assembly are rotated, said flexible hose means is rotated.

2. The sanitary fitting of claim 1 wherein said base of said valve body includes a pivot-like trunion and is rotatably mounted in sliding frictional engagement on said tubular manifold.

3. The sanitary fitting of claim 2 wherein said pivot-like trunion includes at least one horizontally extending slot formed in a vertical wall of said pivot-like trunion, said slot extending an arcuate distance of about 90° to provide stop means at each end of said slot so as to prevent said valve body from being rotatable beyond about 90°.

4. The sanitary fitting of claim 1 wherein said coupling means includes at least one tension screw threadedly mounted on said tubular manifold and is adjustable to and away from said valve body to provide predetermined tension on said rotatable joint whereby the valve body and valve assembly is prevented from being rotated unintentionally when said sanitary fitting is operated from its closed and opened positions.

* * * * *